(12) United States Patent
Guey et al.

(10) Patent No.: US 10,530,565 B2
(45) Date of Patent: Jan. 7, 2020

(54) SEQUENCE DESIGN FOR SYNCHRONIZATION AND DEVICE IDENTIFICATION IN WIRELESS COMMUNICATION SYSTEMS

(71) Applicant: MediaTek Inc., Hsinchu (TW)

(72) Inventors: Jiann-Ching Guey, Hsinchu (TW);
Chun-Hsuan Kuo, San Jose, CA (US);
Chao-Cheng Su, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/906,373

(22) Filed: Feb. 27, 2018

(65) Prior Publication Data
US 2018/0254885 A1    Sep. 6, 2018

Related U.S. Application Data

(60) Provisional application No. 62/466,391, filed on Mar. 3, 2017, provisional application No. 62/471,387, filed
(Continued)

(51) Int. Cl.
| | | |
|---|---|---|
| H04K 1/10 | (2006.01) | |
| H04L 27/28 | (2006.01) | |
| H04L 7/04 | (2006.01) | |
| H04L 27/26 | (2006.01) | |
| H04J 11/00 | (2006.01) | |
| H04J 13/00 | (2011.01) | |

(52) U.S. Cl.
CPC .......... *H04L 7/043* (2013.01); *H04J 11/0073* (2013.01); *H04J 11/0076* (2013.01); *H04J 13/0025* (2013.01); *H04L 27/2602* (2013.01); *H04L 27/2613* (2013.01); *H04L 27/2692* (2013.01)

(58) Field of Classification Search
CPC .. H04L 7/043; H04L 27/2602; H04W 74/002; H04J 11/0076; H04J 11/0073
USPC .......................................... 375/260, 362, 365
See application file for complete search history.

(56) References Cited

U.S. PATENT DOCUMENTS

2008/0273522 A1* 11/2008 Luo ...................... H04J 11/0076
370/350
2015/0305062 A1* 10/2015 Sung ................... H04W 74/002
370/329

FOREIGN PATENT DOCUMENTS

| CN | 101094027 A | 12/2007 |
|---|---|---|
| CN | 101098218 A | 1/2008 |
| WO | WO 2009051549 A1 | 4/2009 |

OTHER PUBLICATIONS

State Intellectual Property Office, International Search Report and Written Opinion for International Patent Application No. PCT/CN2018/077923, dated May 23, 2018.
(Continued)

*Primary Examiner* — Phuong Phu
(74) *Attorney, Agent, or Firm* — Han IP PLLC; Andy M. Han (57) ABSTRACT

Techniques, schemes and examples pertaining to sequence design for synchronization and device identification in mobile communication systems are described. A processor of an apparatus generates a set of root sequences and also generates a set of signature sequences from the set of root sequences. The processor then transmits a signal comprising one or more of the signature sequences to a receiving device via a wireless channel. Each signature sequence of the set of signature sequences identifies the apparatus.

14 Claims, 6 Drawing Sheets

Related U.S. Application Data on Mar. 15, 2017, provisional application No. 62/483,968, filed on Apr. 11, 2017.

(56) References Cited

OTHER PUBLICATIONS

Taiwan Intellectual Property Office, Office Action for Taiwan Patent Application No. 107107265, dated Feb. 27, 2019.

* cited by examiner

FIG. 6 though the time-frequency selective wireless channel. However, there may be occasions in which the number of sequences generated in a conventional manner is not enough for the number of wireless communication devices in the system. For example, insufficient number of sequences may occur when any of the following condition exists: (1) the channel having very large delay-Doppler spread that limits the number of sequences; (2) the wireless communication devices being not synchronous in time, thereby cyclic time shift resulting in ambiguity; (3) the sequence length being limited by available resources; and (4) large number of wireless communication devices being active in the system, such as massive Machine Type Communication (mMTC). Moreover, for a large number of wireless communication devices, complexity of detection of sequences can become very high.

SEQUENCE DESIGN FOR SYNCHRONIZATION AND DEVICE IDENTIFICATION IN WIRELESS COMMUNICATION SYSTEMS

CROSS REFERENCE TO RELATED PATENT APPLICATIONS

The present disclosure is part of a non-provisional application that claims the priority benefit of U.S. Provisional Patent Application Nos. 62/466,391, 62/471,387 and 62/483,968, filed on 3 Mar. 2017, 15 Mar. 2017 and 11 Apr. 2017, respectively. Contents of above-listed applications are herein incorporated by reference in their entirety.

TECHNICAL FIELD

The present disclosure is generally related to mobile communications. In particular, the present disclosure is related to sequence design for synchronization and device identification in mobile communication systems.

BACKGROUND

Unless otherwise indicated herein, approaches described in this section are not prior art to the claims listed below and are not admitted as prior art by inclusion in this section.

A wireless communication device needs to be uniquely identified by other devices (e.g., base stations) by transmitting a signature sequence so that multiple devices in a wireless communication network need to be identified unambiguously. Thus, the design of a large number of uniquely identifiable signature sequences is of paramount importance. Specifically, the uniqueness of each sequence needs to be preserved after passing through the time-frequency selective wireless channel. However, there may be occasions in which the number of sequences generated in a conventional manner is not enough for the number of wireless communication devices in the system. For example, insufficient number of sequences may occur when any of the following condition exists: (1) the channel having very large delay-Doppler spread that limits the number of sequences; (2) the wireless communication devices being not synchronous in time, thereby cyclic time shift resulting in ambiguity; (3) the sequence length being limited by available resources; and (4) large number of wireless communication devices being active in the system, such as massive Machine Type Communication (mMTC). Moreover, for a large number of wireless communication devices, complexity of detection of sequences can become very high.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In one aspect, a method may involve a processor of an apparatus generating a set of root sequences. The method may also involve the processor generating a set of signature sequences from the set of root sequences. The method may further involve the processor transmitting a signal comprising one or more of the signature sequences to a receiving device via a wireless channel. Each signature sequence of the set of signature sequences may identify the apparatus.

In one aspect, a method may involve a processor of an apparatus receiving, from a transmitting device, a signal comprising one or more signature sequences, with the one or more signature sequences comprising a $Z_4$ sequence as well as identifying the transmitting device. The method may also involve the processor detecting the $Z_4$ sequence in the received signal. The one or more signature sequences may be generated from a set of root sequences that are generated from the $Z_4$ sequence. The $Z_4$ sequence may be generated from a $Z_4$ generating sequence and a characteristic m-sequence.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Overview

In general, a set of L sequences can be generated by cyclically shifting a properly chosen root sequence s[n] of length n in both time and frequency domain. Each sequence has a unique time-frequency shift. The difference in time-frequency shifts between any two sequences in the set is greater than or equal to the maximum delay-Doppler spread of the channel, as denoted by Equation 1 below.

$$s_{l,m}[n] = s[\mod(n - l\tau_d, N)]e^{\frac{j2\pi m v_d n}{N}}, n = 0, \cdots, N-1, \text{ or}$$

$$S_{l,m}[k] = S[\mod(k - mv_d, N)]e^{\frac{-j2\pi l\tau_d k}{N}}, k = 0, \cdots, N-1$$

in the frequency domain equivalent representation (1)

In Equation 1, $$S[k] = \sum_{n=0}^{N-1} s[n]e^{\frac{-j2\pi kn}{N}}$$

is the DFT of the root sequence s[n], and ($\tau_d$, $v_d$) is the maximal delay-Doppler of the channel. A time domain sequence is conventionally expressed in lower case with index n, whereas a frequency domain sequence is conventionally expressed in upper case with index k. The number of available sequences is $L=N^2/(\tau_d v_d)$. The delay spread $\tau_d$ may include the timing offset between the devices.

Additional sequences for identifying even more devices can be generated by properly selecting multiple root sequences, as denoted by Equation 2 below.

$\Phi_s=\{s^0[n], s^1[n], \ldots, s^{M_\Phi-1}[n]\}$ denotes the set of $M_\Phi$ multiple root sequences in the time domain (2)

Equivalent frequency domain representation can be denoted by Equation 3 below.

$\Phi_S=\{S^0[k], S^1[k], \ldots, S^{M_\Phi-1}[k]\}$ (3)

Here, each root sequence in the root sequence set $\Phi_S$ has good ambiguity function (e.g., less than a first threshold). Additionally, the cross-ambiguity function, denoted by Equation 4 below, between any pair of the root sequences is low (e.g., less than a second threshold).

$$\chi_{s^i,s^j}[\tau, v] = \sum_{n=0}^{N-1} s^i[n]s^{j*}[n-\tau]e^{\frac{-j2\pi vn}{N}} \quad (4)$$

The total number of available sequences is $M_\Phi L$. One example for set of root sequences may be a subset of the N length-N BPSK-modulated Gold sequences where $N=2^q-1$ for any order $q>0$. Gold sequences, also known as Gold codes, have bounded small cross correlation within a set, which is useful when multiple wireless communication devices are broadcasting in the same frequency range. A set of Gold sequences typically include $2^q-1$ sequences with each having a period of $2^q-1$. Another example for set of root sequences may be a subset of the N+2 length-N quadrature phase shift keying (QPSK)-modulated $Z_4$ sequences where $N=2^q-1$ for any order $q>0$.

Using $Z_4$ set of root sequences as an example, the set of root sequences is a subset of $2^{'q}+1$ QPSK-modulated $Z_4$ sequences of length $N=2^q-1$, as denoted by Equation 5 below.

$\Phi_S=\{S^0[k], S^1[k], \ldots, S^{M_\Phi-1}[k]\}$, that is, $S^0[k], S^1[k], \ldots, S^{M_\Phi-1}[k]$ are $Z_4$ sequences (5)

In one example, q=8, N=255, $M_\Phi=N+2=257$. The $Z_4$ sequence is modulated in the frequency domain, given by $\Phi_S=\{S^0[k], S^1[k], \ldots, S^{256}[k]\}$. The corresponding time domain sequence set is given by $\Phi_s=\{s^0[n], s^1[n], \ldots, s^{256}[n]\}$. Given $v_d=64$, each of the $M_\Phi=257$ root sequences is cyclically shifted M=4 times in frequency by $v=mv_d$, for m=0, 1, 2, 3, to generate a total of 257×4=1028 sequences, as denoted by Equation 6 below.

$$\Psi = \begin{Bmatrix} S^0[k] & S^1[k] & \cdots & S^{256}[k] \\ S^0[k-64] & S^1[k-64] & \cdots & S^{256}[k-64] \\ \vdots & \vdots & \ddots & \vdots \\ S^0[k-3\times64] & S^1[k-3\times64] & \cdots & S^{256}[k-3\times64] \end{Bmatrix} \quad (6)$$

In the frequency domain, cross correlation between any two different sequences in $\Psi$ is less than 17, as denoted by Equation 7 below.

$$\left|\sum_{k=0}^{N-1} S^i[k]S^{j*}[k-mv_d]\right| \leq 17, \text{ for all } i \neq j \text{ or } m \neq 0 \quad (7)$$

The first $Z_4$ sequences of length N can be generated by a Linear Feedback Shift Register (LFSR) over the group $Z_4$ (modulo 4 operations). With an arbitrary non-zero initial state, the sequence can be periodic with period $N=2^q-1$. Any cyclic shift of a $Z_4$ sequence can be considered the same as the original sequence. A new sequence can be generated by setting the initial state to any state that has not been previously visited. All N+2 sequences can be generated after exhausting all $4^q-1$ non-zero states. The quaternary outputs $a_i(n)$ are mapped to the $\pi/4$-rotated QPSK constellation.

In the $Z_4$ sequence example, detection of the sequence can be achieved by computing an inner product between a received signal and each of the $M_\Phi=2^q+2$ candidate sequences, as denoted by Equation 8 below.

$$\lambda_{i,m} = \sum_{n=0}^{N-1} R[k-mv_d]S_i^*[k], \text{ for } i = 0, 1, \ldots, 2^q+2,$$

for each of the frequency offset $mv_d$, m=0, 1, ..., M−1 (8)

Each device is uniquely identified by its assigned index [i, m] as $[\hat{i}, \hat{m}]=\arg \max_{i,m}|\lambda_{i,m}|$. Each inner product takes $N=2^q-1$ complex multiplications. This results in a total of $M_\Phi MN$ complex multiplications. As mentioned above, when the number of wireless communication devices is large, complexity of detection may become very high.

Proposed Schemes

Under a proposed scheme in accordance with the present disclosure, multiple root sequences are selected such that each root sequence has a good ambiguity function. A set of multiple root sequences that are selected may be denoted by Equation 9 below.

$\Phi_s=\{s^0[n], s^1[n], \ldots, s^{M-1}[n]\}$ (9)

Moreover, the multiple root sequences are selected such that the cross-ambiguity function, as denoted by Equation 10 below, between any pair of the root sequences is low.

$$\chi_{s^i,s^j}[\tau, v] = \sum_{n=0}^{N-1} s^i[n]s^{j*}[n-\tau]e^{\frac{-j2\pi vn}{N}} \quad (10)$$

Accordingly, the total number of available sequences may be increased M folds to ML.

In a first approach under the proposed scheme, the multiple root sequences may be a subset of $N=2^q-1$ binary phase shifting keying (BPSK)-modulated Gold sequences of length N, as denoted by Equation 11 below.

$$\Phi_s=\{s^0[n],s^1[n],\ldots,s^{M-1}[n]\} \quad (11)$$

When M is chosen to be N, the complete set of the Gold sequences may form the set of root sequences $\Phi_s$.

As an example, with q=7, N=127, M=N, the Gold sequence may be modulated in the frequency domain as denoted by Equation 12 below.

$$\Phi_S=\{S^0[k],S^1[k],\ldots,S^{N-1}[k]\} \quad (12)$$

Given $v_d=16$, each of the N=127 root sequences may be cyclically shifted 8 times in frequency by $v=mv_d$, for m=0, 1, . . . , 7, to generate a total of 127×8=1016 sequences, as denoted by Equation 13 below.

$$\Psi = \begin{Bmatrix} S^0[k] & S^1[k] & \cdots & S^{126}[k] \\ S^0[k-16] & S^1[k-16] & \cdots & S^{126}[k-16] \\ \vdots & \vdots & \ddots & \vdots \\ S^0[k-112] & S^1[k-112] & \cdots & S^{126}[k-112] \end{Bmatrix} \quad (13)$$

As another example, the Gold sequence may be modulated in the time domain, as denoted by Equation 14 below.

$$\Phi_s=\{s^0[n],s^1[n],\ldots,s^{N-1}[n]\} \quad (14)$$

Each of the N=127 root sequences may be cyclically shifted 8 times in time by $\tau=l\tau_d$, for l=0, 1, . . . , 7, and $\tau_d=16$ to generate a total of 127×8=1016 sequences.

In a second approach under the proposed scheme, the multiple root sequences may be a subset of M BPSK-modulated m-sequences of length $N=2^m-1$ generated by M distinct minimal polynomials over $GF(2^m)$. The number of distinct minimal polynomials may depend on the order m. The "phase" (or the cyclic shift) of each root sequence may be arbitrary.

As yet another example, with m=8, N=255, M=2, the m-sequence may be modulated in the frequency domain, as denoted by Equation 15 below.

$$\Phi_S=\{S^0[k],S^1[k]\} \quad (15)$$

The two generating polynomials may be denoted by Equation (16) below.

$$1+D^4+D^5+D^6+D^8 \text{ and}$$

$$1+D^2+D^3+D^4+D^8 \quad (16)$$

Each root sequence may be cyclically shifted in frequency domain 255 times to generate a total of 255×2=510 sequences. The maximum value of the cross-ambiguity function between $S^0[k]$ and $S^1[k]$ is 32. That is, the cross correlation between any relative time and frequency shift of $S^0[k]$ and $S^1[k]$ is at most 32.

In a third approach under the proposed scheme, the multiple root sequences may be a subset of $2^q+1$ QPSK-modulated $Z_4$ sequences of length $N=2^q-1$, as denoted by Equation 17 below.

$$\Phi_S=\{s^0[n],s^1[n],\ldots,s^{M-1}[n]\} \quad (17)$$

When M is chosen to be N+2, the complete set of the $Z_4$ sequence may form the set of root sequences $\Phi_s$.

As an example, with q=8, N=255, M=N+2=257, the $Z_4$ sequence may be modulated in the time domain, given by $\Phi_s=\{s^0[n], s^1[n], \ldots, s^{256}[n]\}$ The corresponding sequence set in the frequency domain may be given by $\Phi_s=\{S^0[k], S^1[k], \ldots, S^{256}[k]\}$. Given $v_d=64$, each of the M=257 root sequences may be cyclically shifted 4 times in frequency by $v=mv_d$, for m=0, 1, 2, 3, to generate a total of 257×4=1028 sequences, as denoted by Equation 18 below.

$$\Psi = \begin{Bmatrix} S^0[k] & S^1[k] & \cdots & S^{256}[k] \\ S^0[k-64] & S^1[k-64] & \cdots & S^{256}[k-64] \\ \vdots & \vdots & \ddots & \vdots \\ S^0[k-192] & S^1[k-192] & \cdots & S^{256}[k-192] \end{Bmatrix} \quad (18)$$

The cross correlation in time domain between any two different sequences in $\Psi$ is less than 32.

As another example, the $Z_4$ sequence may be modulated in the frequency domain, as denoted by Equation 19 below.

$$\Phi_S=\{S^0[k],S^1[k],\ldots,S^{N-1}[k]\} \quad (19)$$

Under another proposed scheme in accordance with the present disclosure, the $Z_4$ sequence may be expressed in an alternative way such that the detector may be detected with much less complexity than with conventional approaches. Accordingly, any cyclic shift of a $Z_4$ sequence may be considered equivalent to the original sequence. Additionally, the property of low cross correlation among all distinct $Z_4$ sequences may be preserved. Under this scheme, any of a set of $2^q+1$ $Z_4$ sequences may be cyclically shifted by an arbitrary number of taps and the resulting set may still be a set of $Z_4$ sequences.

Regarding frequency domain $Z_4$ sequences of length $N=2^q-1$, one of the sequences may be a BPSK-modulated m-sequence, with the m-sequence denoted by $S_m[k]$. The square of each of the remaining $2^q$ sequence may be the same m-sequence cyclically shifted by a certain number of taps. Given an arbitrary sequence $S_Z[k]$ in the remaining $2^q$ sequence, any sequence other than the m-sequence $S_m[k]$ and $S_Z[k]$ itself may be expressed as the element-wise multiplication of $S_Z[k]$ and $S_m[(k-i)\bmod N]$, k=0, . . . , N-1 for a certain integer i. The integer i is unique for each of the $2^q-1$ sequence.

As an example of sequence generation, the LFSR with a proper generating polynomial and arbitrary non-zero initial state may be used to find an arbitrary $Z_4$ sequence $S_Z[k]$ of length $N=2^q-1$ that is not an m-sequence. Here, $S_Z[k]$ is referred to as the $Z_4$ generating-sequence. The m-sequence $S_m[k]=S_Z^2[k]$ may also be determined. Here, $S_m[k]$ is referred to as the characteristic m-sequence. The remaining $2^q-1$ $Z_4$ sequences may be generated by an operation as denoted by Equation 20 below.

$$S^i[k]=S_Z[k]\cdot S_m[(k-i)\bmod N], \text{ for } i=0,\ldots,N-1 \quad (20)$$

The set of $N=2^q-1$ sequences $\{S^i[k]|i=0,\ldots,N-1\}$ may be used as a set of root sequences $\Phi_S$ for device identification. Moreover, $S_Z[k]$ may be included in the set. It is noteworthy that, although above examples are provided in the frequency domain, the same may be applied in the time domain.

Figure 1:
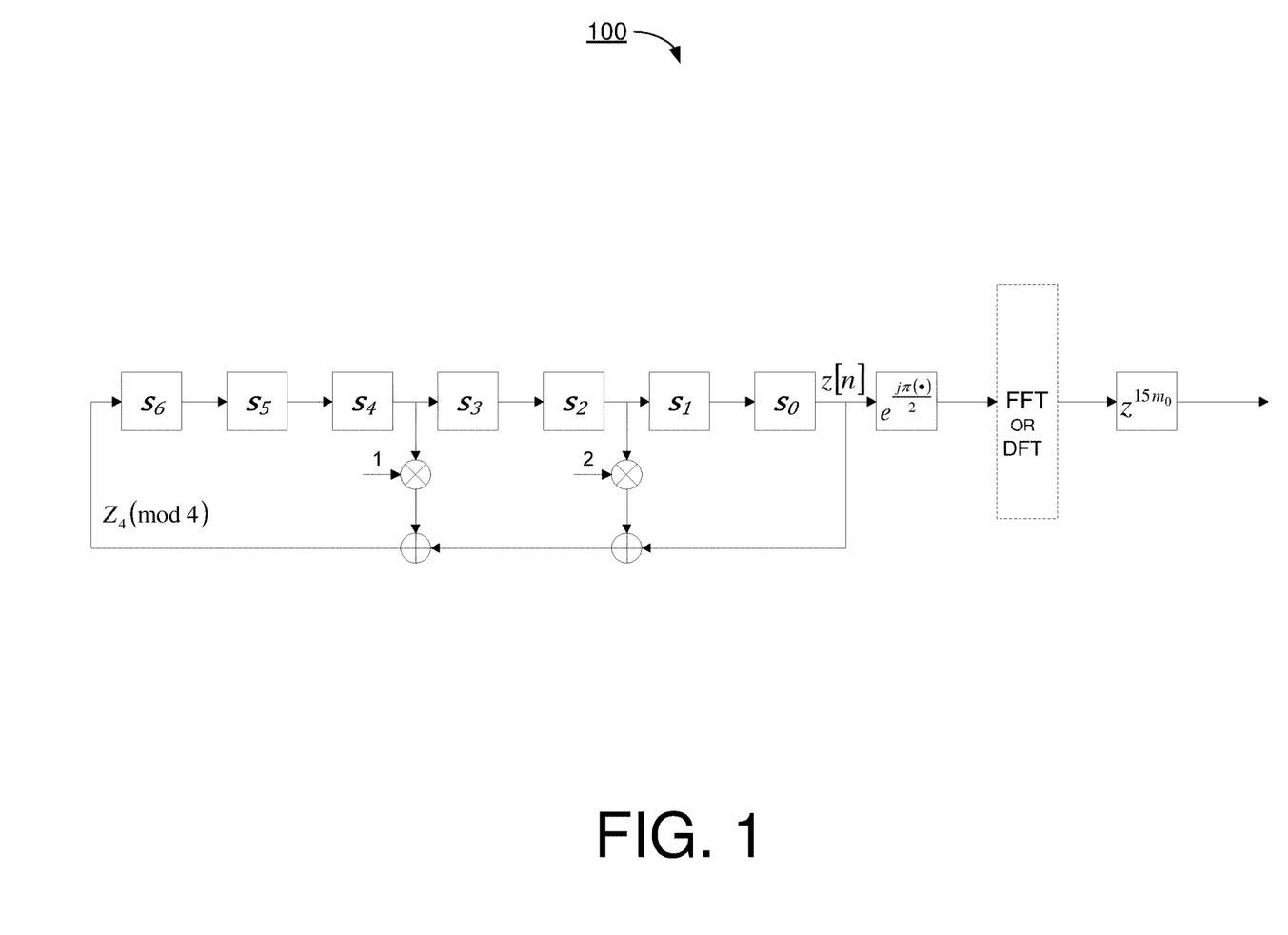
FIG. 1 is a diagram of an example circuit of Linear Feedback Shift Register (LFSR) in accordance with an implementation of the present disclosure.

As another example of sequence generation for q=7, a shift register may be initialized with values $\{s_6=2n_6, s_5=2n_5, s_4=2n_4, s_3=2n_3, s_2=2n_2, s_1=2n_1, s_0=2n_0+1\}$ to generate 128 sequences of length $N=2^q-1=127$. Here, $\{n_0, n_1, \ldots, n_6\}$ is the binary representation (from the least-significant bit (LSB) to the most-significant bit (MSB)) of any integer from 0 to 127. An optional Fast Fourier Transform (FFT) or Discrete Fourier Transform (DFT) may then be applied to the sequence. The LFSR may produce a sequence with an arbitrary length, preferably one that is suitable for FFT in an event that FFT is applied. The sequence may be further cyclically shifted to create more sequences. For each additional cyclic shift applied to the set of 128 sequences generated by the LFSR, an additional 128 sequences may be generated for device identification. FIG. 1 illustrates an example LFSR 100 that implements this example in accordance with the present disclosure.

Figure 2:
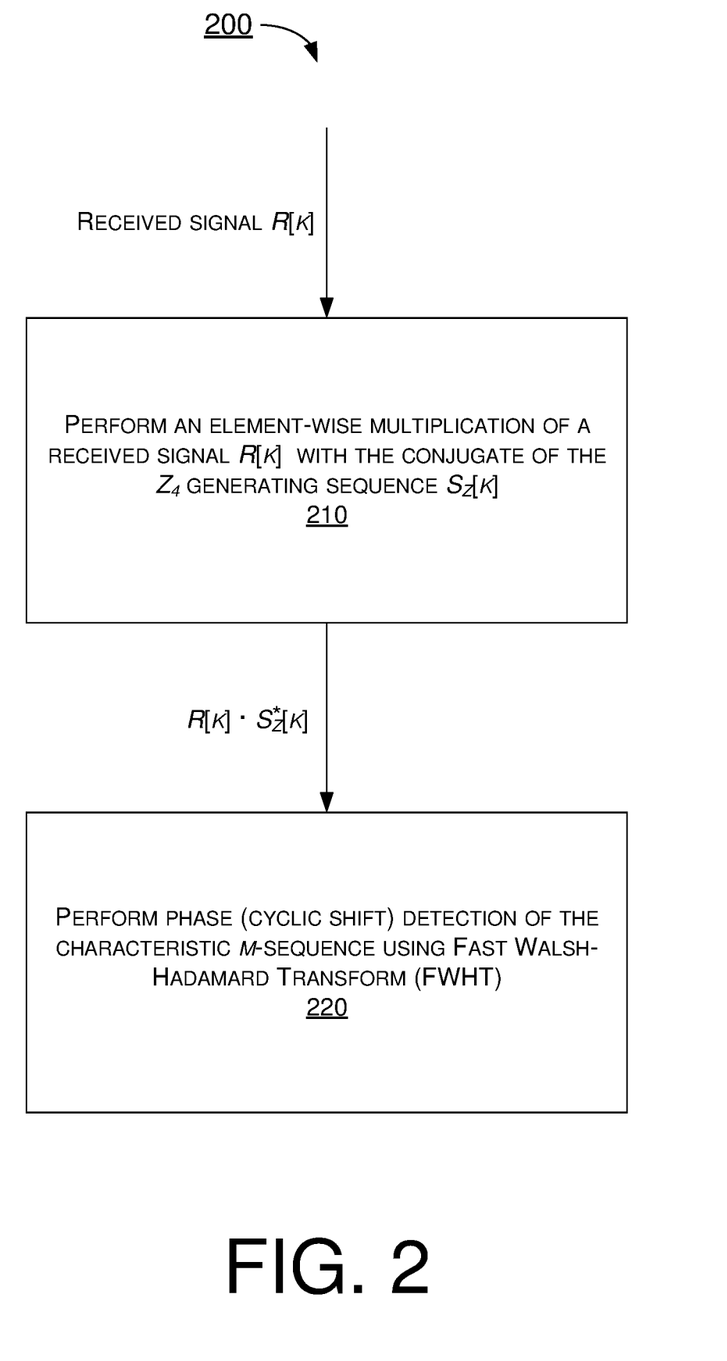
FIG. 2 is a diagram of an example procedure for detection of a $Z_4$ sequence in accordance with an implementation of the present disclosure.

Under the proposed scheme, detection of the $Z_4$ sequence constructed as described above may be accomplished by a procedure. FIG. 2 illustrates an example procedure 200 for detection of a $Z_4$ sequence in accordance with an implementation of the present disclosure. Procedure 200 may represent an aspect of implementing the proposed concepts and schemes with respect to detection of a $Z_4$ sequence in multiple (e.g., two) stages. Procedure 200 may include one or more operations, actions, or functions as illustrated by one or more of blocks 210 and 220. Although illustrated as discrete blocks, various blocks of procedure 200 may be divided into additional blocks, combined into fewer blocks, or eliminated, depending on the desired implementation. Moreover, the blocks of procedure 200 may be executed in the order shown in FIG. 2 or, alternatively in a different order. The blocks of procedure 200 may be executed iteratively. Procedure 200 may begin at block 210.

At 210, procedure 200 may involve performing an element-wise multiplication of a received signal R[k] with the conjugate of a $Z_4$ generating sequence $S_Z[k]$, denoted as $S_Z^*[k]$. Procedure 200 may proceed from 210 to 220.

At 220, procedure 200 may involve performing phase (cyclic shift) detection of the characteristic m-sequence using Fast Walsh-Hadamard Transform (FWHT). In some implementations, a permutation may be performed on the incoming samples before FWHT is applied. Additionally, the complexity of FWHT may be in the order of N $\log_2$ N for all N phases, where N is the sequence length.

In view of the above, under the proposed schemes in accordance with the present disclosure, a set of signature sequences of length N may be generated from a set of $M_\Phi$ root sequences for the purpose of device identification in wireless communication systems. The set of sequences $\Phi_s = \{s^0[n], s^1[n], \ldots, s^{M_\Phi - 1}[n]\}$ may be selected in a way such that each root sequence has a good ambiguity function $$\chi_{s^i,s^i}[\tau, v] = \sum_{n=0}^{N-1} s^i[n] s^{i*}[n-\tau] e^{\frac{-j2\pi v n}{N}},$$

which is low for all times and frequencies $[\tau, v]$ except for $[\tau, v] = [0, 0]$. Moreover, the cross-ambiguity function, $$\chi_{s^i,s^j}[\tau, v] = \sum_{n=0}^{N-1} s^i[n] s^{j*}[n-\tau] e^{\frac{-j2\pi v n}{N}},$$

between any pair of the root sequences $\{s^i[n], s^j[n]\}$ is low for all $[\tau, v]$. The set of root sequences may be modulated in either time domain or frequency domain.

The set of signature sequences, as denoted by Equation 21 below, may be generated by cyclically shifting the sequences in the root sequence set $\Phi_s$ in either or both of time domain and frequency domain.

$$s^i_{l,m}[n] = s^i[\mathrm{mod}(n - l\tau_d, N)] e^{\frac{j2\pi m v_d n}{N}}, n = 0, \cdots, N-1 \quad (21)$$

The total number of sequences in the set may be the product of number of i, l and m. The cyclical shift in the time domain may be no less than the maximum delay spread of the wireless channel, and the cyclical shift in the frequency domain may be no less than the maximum Doppler spread of the wireless channel. Moreover, the cyclical shift in the frequency domain, $|v_d|$, may be greater than 1 to avoid ambiguity in the presence of residual frequency error.

In some implementations, the set of root sequences may be a subset of the $2^q - 1$ Gold sequences of length $N = 2^q - 1$ generated by the sum of two m-sequences generated by two distinct minimal polynomials of order q, where q is an integer. In some implementations, the set of root sequences may be a subset of the length $N = 2^q - 1$ m-sequences of an arbitrary phase generated by a subset of the minimal polynomials of order q. In some implementations, the set of root sequences may be a subset of the $2^q + 1$ $Z_4$ sequences of length $N = 2^q - 1$ generated by a $q^{th}$ order polynomial over the group $Z_4$.

In some implementations, the set of root sequences including the $Z_4$ sequences of length $N = 2^q - 1$ may be generated from a $Z_4$ generating sequence and a characteristic m-sequence. The $Z_4$ generating sequence may be an arbitrary $Z_4$ sequence that is not an m-sequence. The arbitrary $Z_4$ generating sequence may be generated using a LFSR over the $Z_4$ group. The characteristic m-sequence may be a square of the $Z_4$ generating sequence or any cyclic shift of the resulting m-sequence. The generation of the remaining $Z_4$ sequences may involve element-wise complex multiplication between the $Z_4$ generating sequence and the cyclic shifts of the characteristic m-sequence. A total of $N = 2^q - 1$ cyclic shifts of the characteristic m-sequence may yield the remaining $2^q - 1$ $Z_4$ sequences, making a total of $2^q + 1$ $Z_4$ sequences including both the $Z_4$ generating sequence and the characteristic m-sequence.

In some implementations, the detection of the $Z_4$ sequences may be implemented by a two-stage detector using procedure 200. For instance, at a first stage, the detector may perform element-wise complex multiplication of a received signal with the conjugate of the $Z_4$ generating sequence. At a second stage following the first stage, the detector may perform phase (cyclic shift) detection of the characteristic m-sequence using FWHT.

In addition to device identification signal (e.g., secondary synchronization signal (SSS) in Long-Term Evolution (LTE) networks) selected from the sequences set Ψ described above, a wireless communication device may transmit a primary synchronization signal (PSS). The number of PSS may be much smaller than the number of SSS, given the cardinality of Ψ. The purpose of PSS is for the receiving device to detect the presence of the transmitting device quickly by searching for the small number of PSS sequences without the need for hypothesizing a large number of SSS sequences. The PSS and SSS may be transmitted by Frequency Division Multiplexing (FDM) or Time Division Multiplexing (TDM) as in LTE. As a reference, in LTE typically there are three PSS sequences and 504 SSS sequences. The choice of PSS and SSS is preferably considered jointly to minimize cross correlation between them. In case one of the PSS has high cross correlation with one of the SSS, the false detection of that SSS, when transmitted, as a PSS can occur. A basic concept of the joint design is to choose the characteristic m-sequence used to construct the $Z_4$ sequences set $\Psi$ as PSS, since it has low cross correlation with any sequence of any cyclic shift in $\Psi$.

Under a proposed scheme in accordance with the present disclosure, when the SSS (or $\Psi$) is generated by using the $Z_4$ generating sequence described above, at least one of the PSS may be chosen to be the characteristic m-sequence of an arbitrary phase used to construct the $Z_4$ sequences. Additional PSS, if any, may be chosen to be the first PSS cyclically shifted in frequency domain by a unique offset. Under the proposed scheme, when the PSS is chosen to be a set of cyclically shifted m-sequences in frequency domain and the SSS is chosen to be a set of $Z_4$ sequences set $\Psi$ described above, the characteristic m-sequence used to construct $\Psi$ may be chosen to be one of the PSS of an arbitrary phase. Under the proposed scheme, when the SSS (or $\Psi$) is generated by using the Gold sequences described above, at least one of the PSS may be chosen to be the m-sequence of an arbitrary phase of either of the two m-sequences used to construct the Gold sequences. Additional PSS, if any, may be chosen to be the first PSS cyclically shifted in frequency domain by a unique offset. Under the proposed scheme, when the PSS is chosen to be a set of cyclically shifted m-sequences in frequency domain and the SSS is chosen to be a set of Gold sequences set $\Psi$ described above, one of the cyclically shifted m-sequences used to construct $\Psi$ may be chosen to be one of the PSS of an arbitrary phase.

Figure 3:
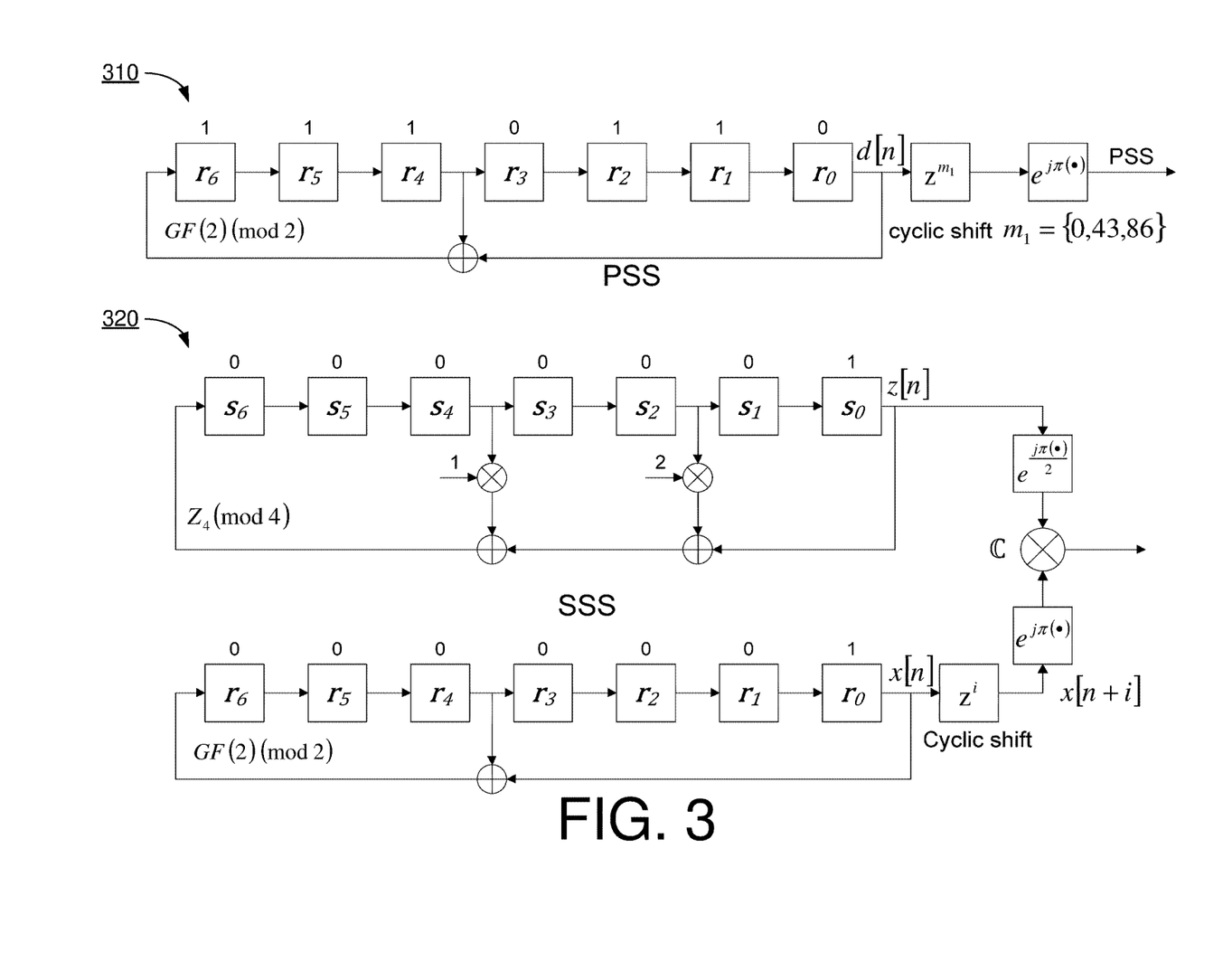
FIG. 3 is a diagram of an example Primary Synchronization Signal (PSS) generation circuit and an example Secondary Synchronization Signal (SSS) generation circuit in accordance with an implementation of the present disclosure.

For illustration and without limiting the scope of the present disclosure, a PSS and SSS design example, with a minimal polynomials of order q=7, is described below. FIG. 3 illustrates an example PSS generation circuit 310 and an example SSS generation circuit 320 in accordance with an implementation of the present disclosure.

Referring to FIG. 3, operation of PSS generation circuit 310 may be represented by Equation 22 below, with the initial state being $\{x[6], \ldots x[1], x[0]\}=\{1,1,1,0,1,1,0\}$.

$$x[n+7]=x[n+4]+x[n], \text{ for } n=0, \ldots, 119 \quad (22)$$

With respect to the $Z_4$ generating sequence $S_Z[k]$, generation of quaternary sequence z[n] (modulo 4) may be denoted by Equation 23 below, with the initial state being $z[0]=1, z[1]=\ldots=z[6]=0$. The modulation may be $S_Z[k]=e^{j\pi z[k]/2}$, $k=0, \ldots, 126$.

$$z[n+7]=z[n+4]+2\cdot z[n+2]+z[n], \text{ for } n=0, \ldots, 119 \quad (23)$$

With respect to the characteristic m-sequence $S_m[k]$, generation of binary sequence x[n] (modulo 2) may be denoted by Equation 24 below, with the initial state being $x[0]=1, x[1]=\ldots=x[6]=0$. The modulation may be $S_m[k]=e^{j\pi x[k]}$, $k=0, \ldots, 126$.

$$x[n+7]=x[n+4]+x[n], \text{ for } n=0, \ldots, 119 \quad (24)$$

The $Z_4$ set of root sequences may be denoted by Equation 25 below.

$$\Phi_S=\{S^i[k]\}, \text{ where } S^i[k]=S_Z[k]\cdot S_m[(k+i)\bmod 127], \text{ for } i=0, \ldots, 126 \quad (25)$$

An extended $Z_4$ set of root sequences may be $\Phi_S=S_Z[k]\cup\{S^i[k], i=0, \ldots, 126\}$.

Illustrative Implementations

Figure 4:
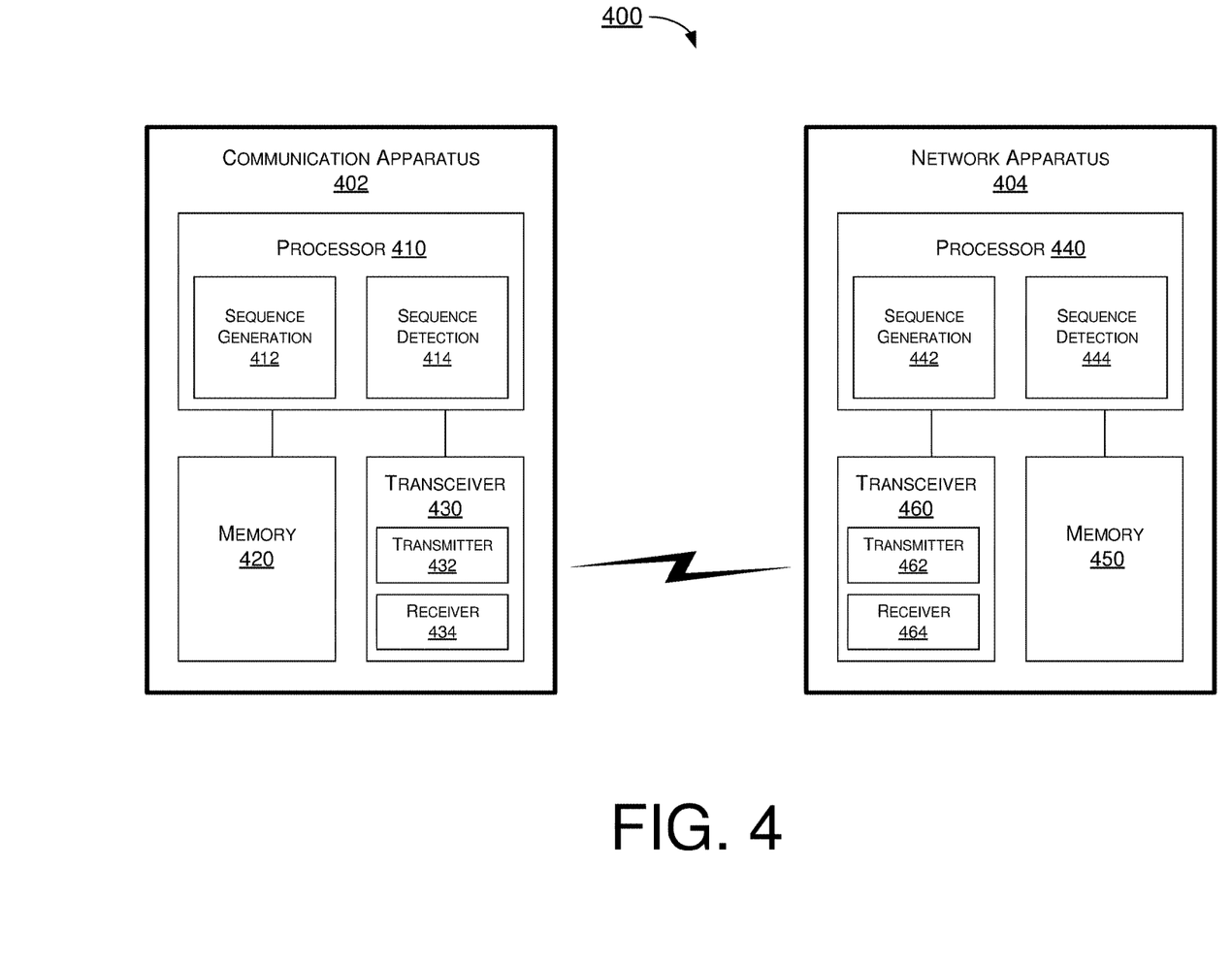
FIG. 4 is a diagram of an example wireless communication system in accordance with the present disclosure.

FIG. 4 illustrates an example wireless communication system 400 that includes at least an example communication apparatus 402 and an example network apparatus 404 in accordance with an implementation of the present disclosure. Each of communication apparatus 402 and network apparatus 404 may perform various functions to implement schemes, techniques, processes and methods described herein pertaining to sequence design for synchronization and device identification in mobile communication systems, including those described above with respect to FIG. 1~FIG. 3 as well as processes 500 and 600 described below.

Communication apparatus 402 may be a part of an electronic apparatus, which may be a user equipment (UE) such as a portable or mobile apparatus, a wearable apparatus, a wireless communication apparatus or a computing apparatus. For instance, communication apparatus 402 may be implemented in a smartphone, a smartwatch, a personal digital assistant, a digital camera, or a computing equipment such as a tablet computer, a laptop computer or a notebook computer. Communication apparatus 402 may also be a part of a machine type apparatus, which may be an IoT or NB-IoT apparatus such as an immobile or a stationary apparatus, a home apparatus, a wire communication apparatus or a computing apparatus. For instance, communication apparatus 402 may be implemented in a smart thermostat, a smart fridge, a smart door lock, a wireless speaker or a home control center. Alternatively, communication apparatus 402 may be implemented in the form of one or more integrated-circuit (IC) chips such as, for example and without limitation, one or more single-core processors, one or more multi-core processors, or one or more complex-instruction-set-computing (CISC) processors. Communication apparatus 402 may include at least some of those components shown in FIG. 4 such as a processor 410, for example. Communication apparatus 402 may further include one or more other components not pertinent to the proposed scheme of the present disclosure (e.g., internal power supply, display device and/or user interface device), and, thus, such component(s) of communication apparatus 402 are neither shown in FIG. 4 nor described below in the interest of simplicity and brevity.

Network apparatus 404 may be a part of an electronic apparatus, which may be a network node such as a base station, a small cell, a router or a gateway. For instance, network apparatus 404 may be implemented in an eNodeB in a LTE, LTE-Advanced or LTE-Advanced Pro network or in a gNB in a 5G, NR, IoT or NB-IoT network. Alternatively, network apparatus 404 may be implemented in the form of one or more IC chips such as, for example and without limitation, one or more single-core processors, one or more multi-core processors, or one or more CISC processors. Network apparatus 404 may include at least some of those components shown in FIG. 4 such as a processor 440, for example. Network apparatus 404 may further include one or more other components not pertinent to the proposed scheme of the present disclosure (e.g., internal power supply, display device and/or user interface device), and, thus, such component(s) of network apparatus 404 are neither shown in FIG. 4 nor described below in the interest of simplicity and brevity.

In one aspect, each of processor 410 and processor 440 may be implemented in the form of one or more single-core processors, one or more multi-core processors, or one or more CISC processors. That is, even though a singular term "a processor" is used herein to refer to processor 410 and processor 440, each of processor 410 and processor 440 may include multiple processors in some implementations and a single processor in other implementations in accordance with the present disclosure. In another aspect, each of processor 410 and processor 440 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 410 and processor 440 is a special-purpose machine specifically designed, arranged and configured to perform specific tasks including sequence design for synchronization and device identification in mobile communication systems in accordance with various implementations of the present disclosure.

In some implementations, processor 410 may include a sequence generation module 412 and a sequence detection module 414. In some implementations, processor 440 may include a sequence generation module 412 and a sequence detection module 414. Each of sequence generation module 412, sequence detection module 414, sequence generation module 412 and sequence detection module 414 may be implemented in hardware (e.g., electronic circuits). Alternatively, each of sequence generation module 412, sequence detection module 414, sequence generation module 412 and sequence detection module 414 may be implemented in software. Still alternatively, of sequence generation module 412, sequence detection module 414, sequence generation module 412 and sequence detection module 414 may be implemented in both hardware and software.

In some implementations, communication apparatus 402 may also include a transceiver 430 coupled to processor 410 and capable of wirelessly transmitting and receiving data. Specifically, transceiver 430 may include a transmitter 432 and a receiver 434 capable of wireless transmission and wireless receiving, respectively. In some implementations, communication apparatus 402 may further include a memory 420 coupled to processor 410 and capable of being accessed by processor 410 and storing data therein. In some implementations, network apparatus 404 may also include a transceiver 460 coupled to processor 440 and capable of wirelessly transmitting and receiving data. Specifically, transceiver 460 may include a transmitter 462 and a receiver 464 capable of wireless transmission and wireless receiving, respectively. In some implementations, network apparatus 404 may further include a memory 450 coupled to processor 440 and capable of being accessed by processor 440 and storing data therein. Accordingly, communication apparatus 402 and network apparatus 404 may wirelessly communicate with each other via transceiver 430 and transceiver 460, respectively. To aid better understanding, the following description of the operations, functionalities and capabilities of each of communication apparatus 402 and network apparatus 404 is provided in the context of a mobile communication environment in which communication apparatus 402 is implemented in or as a communication apparatus or a UE and network apparatus 404 is implemented in or as a network node (e.g., eNB or gNB) of a communication network.

In some implementations, sequence generation module 412 of processor 410 of apparatus 402 may generate a set of root sequences and generate a set of signature sequences from the set of root sequences. Each signature sequence of the set of signature sequences may identify apparatus 402 of a component thereof (e.g., transmitter 432, transceiver 430 or processor 410). Processor 410 may also transmit, via transmitter 432, a signal comprising one or more of the signature sequences to a receiving device (e.g., receiver 464 of transceiver 460 of apparatus 404) via a wireless channel.

In some implementations, in generating the set of root sequences, sequence generation module 412 may generate the set of root sequences such that an ambiguity function of each root sequence is less than a first threshold and that a cross-ambiguity function between any pair of root sequences of the set of root sequences is less than a second threshold.

In some implementations, in generating the set of root sequences, sequence generation module 412 may generate m-sequences of a length $N=2^q-1$ and an arbitrary phase by a set of minimal polynomials of an order q, with q being an integer. In such cases, a subset of the m-sequences of the length $N=2^q-1$ may form the set of root sequences.

In some implementations, in generating the set of root sequences, sequence generation module 412 may generate $2^q+1$ $Z_4$ sequences of a length $N=2^q-1$ by a $q^{th}$ order polynomial over a group $Z_4$, with q being an integer. In such cases, a subset of the $2^q+1$ $Z_4$ sequences of the length $N=2^q-1$ may form the set of root sequences.

In some implementations, in generating the set of root sequences, sequence generation module 412 may generate two m-sequences by two distinct minimal polynomials of an order q, with q being an integer. Additionally, sequence generation module 412 may generate $2^q-1$ Gold sequences of a length $N=2^q-1$ by a sum of the two m-sequences. In such cases, a subset of the $2^q-1$ Gold sequences may form the set of root sequences. In some implementations, in transmitting the signal comprising one or more of the signature sequences, sequence generation module 412 may generate one or more primary synchronization signals and generating a plurality of secondary synchronization signals. Additionally, processor 1210 may transmit at least one of the one or more primary synchronization signals and one or more of the plurality of secondary synchronization signals.

In some implementations, in generating the one or more primary synchronization signals, sequence generation module 412 may generate at least one of the one or more primary synchronization signals as an m-sequence of an arbitrary phase of either of the two m-sequences used to construct the Gold sequences. Moreover, sequence generation module 412 may generate another of the one or more primary synchronization signals as a first primary synchronization signal cyclically shifted in a frequency domain by a unique offset. In such cases, the plurality of secondary synchronization signals may be generated using the Gold sequences.

In some implementations, in generating the one or more primary synchronization signals, sequence generation module 412 may generate at least one of the one or more primary synchronization signals as a set of cyclically shifted m-sequences in a frequency domain. Additionally, in generating the plurality of secondary synchronization signals, sequence generation module 412 may generate at least one of the plurality of secondary synchronization signals as a set of the Gold sequences. In such cases, one of the two m-sequence used to construct the Gold sequences may be one of the one or more primary synchronization signals of an arbitrary phase.

In some implementations, in generating the set of root sequences, sequence generation module 412 may generate $2^q+1$ $Z_4$ sequences of a length $N=2^q-1$ from a $Z_4$ generating sequence and a characteristic m-sequence. In such cases, a subset of the $2^q+1$ $Z_4$ sequences of the length $N=2^q-1$ may form the set of root sequences.

In some implementations, the $Z_4$ generating sequence may include an arbitrary $Z_4$ sequence that is not an m-sequence. Moreover, the characteristic m-sequence may include a square of the $Z_4$ generating sequence or a cyclic shift of a resulting m-sequence.

In some implementations, in generating the $2^q+1$ $Z_4$ sequences of the length $N=2^q-1$ from the $Z_4$ generating sequence and the characteristic m-sequence, sequence generation module 412 may generate the arbitrary $Z_4$ sequence using a Linear Feedback Shift Register (LFSR) over a $Z_4$ group.

In some implementations, sequence generation module 412 may also generate remaining $Z_4$ sequences by performing element-wise complex multiplication between the $Z_4$ generating sequence and cyclic shifts of the characteristic m-sequence.

In some implementations, in transmitting the signal comprising one or more of the signature sequences, sequence generation module 412 may generate one or more primary synchronization signals and generating a plurality of secondary synchronization signals. Additionally, processor 410 may transmit at least one of the one or more primary synchronization signals and one or more of the plurality of secondary synchronization signals.

In some implementations, in generating the one or more primary synchronization signals, sequence generation module 412 may generate at least one of the one or more primary synchronization signals as a characteristic m-sequence of an arbitrary phase used to construct the $Z_4$ sequences. Moreover, sequence generation module 412 may generate another of the one or more primary synchronization signals as a first primary synchronization signal cyclically shifted in a frequency domain by a unique offset. In such cases, the plurality of secondary synchronization signals may be generated using the $Z_4$ sequences.

In some implementations, in generating the one or more primary synchronization signals, sequence generation module 412 may generate at least one of the one or more primary synchronization signals as a set of cyclically shifted m-sequences in a frequency domain. Additionally, in generating the plurality of secondary synchronization signals, sequence generation module 412 may generate at least one of the plurality of secondary synchronization signals as a set of the $Z_4$ sequences. In such cases, the characteristic m-sequence used to construct the $Z_4$ sequences may be one of the one or more primary synchronization signals of an arbitrary phase.

In some implementations, in generating the set of signature sequences from the set of root sequences, sequence generation module 412 may cyclically shift root sequences of the set of root sequences in either or both of a time domain and a frequency domain. In some implementations, in cyclically shifting the root sequences of the set of root sequences in the time domain, sequence generation module 412 may cyclically shift the root sequences by a shift that is no less than a maximum delay spread of the wireless channel. Moreover, in cyclically shifting the root sequences of the set of root sequences in the frequency domain, sequence generation module 412 may generate cyclically shift the root sequences by a shift that is greater than 1 but no less than a maximum Doppler spread of the wireless channel.

In some implementations, processor 440 of apparatus 404 may receive, via receiver 464 from a transmitting device (e.g., transmitter 432 of apparatus 402), a signal comprising one or more signature sequences identifying the transmitting device. Additionally, sequence detection module 444 of processor 440 may detect a set of $Z_4$ sequences in the received signal. The one or more signature sequences may be generated from a set of root sequences that are generated from the set of $Z_4$ sequences. The set of $Z_4$ sequences may be generated from a $Z_4$ generating sequence and a characteristic m-sequence.

In some implementations, in detecting the set $Z_4$ sequences in the received signal, sequence detection module 444 may perform element-wise multiplication of the received signal with a conjugate of the $Z_4$ generating sequence. Moreover, sequence detection module 444 may perform a phase detection of the characteristic m-sequence using Fast Walsh-Hadamard Transform (FWHT).

In some implementations, in performing the phase detection of the characteristic m-sequence using the FWHT, a sequence detection module 444 may perform a permutation on the received signal before FWHT is applied. In such cases, a complexity of the FWHT may be in an order of N $\log_2$ N for all N phases, with N denoting a sequence length.

It is noteworthy that the description above with respect to the capabilities of processor 410 (and communication apparatus 402 in general) is applicable to processor 440 (and network apparatus 404 in general), and vice versa. That is, processor 440 may perform operations, functions and actions of processor 410 as described above, and network apparatus 404 may perform operations, functions and actions of communication apparatus 402 as described above. Likewise, processor 410 may perform operations, functions and actions of processor 440 as described above, and communication apparatus 402 may perform operations, functions and actions of network apparatus 404 as described above.

Illustrative Processes

Figure 5:
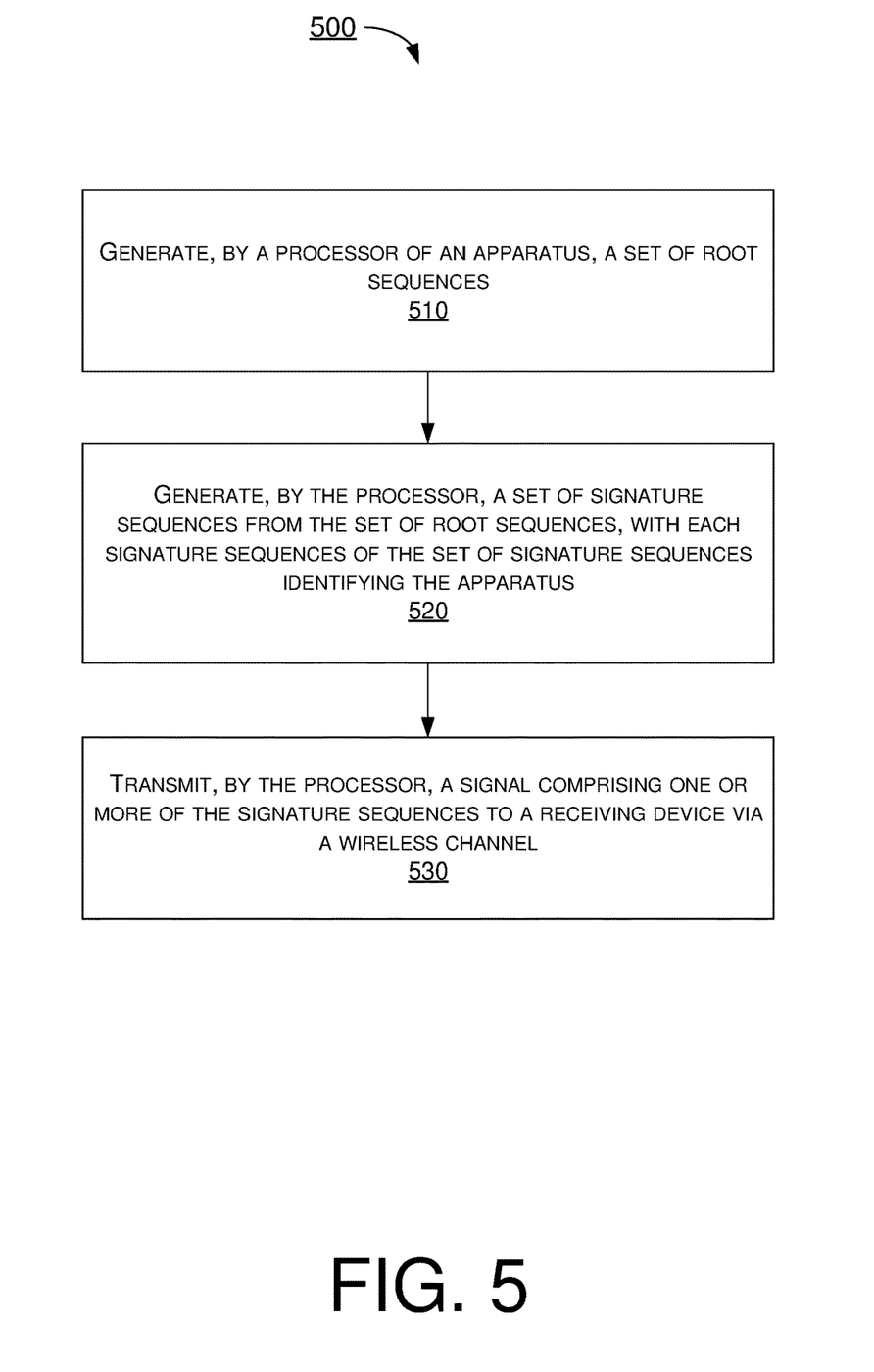
FIG. 5 is a flowchart of a process in accordance with the present disclosure.

FIG. 5 illustrates an example process 500 in accordance with an implementation of the present disclosure. Process 500 may represent an aspect of implementing the proposed concepts and schemes such as one or more of the various schemes, concepts, embodiments and examples described above. More specifically, process 500 may represent an aspect of the proposed concepts and schemes pertaining to sequence design for synchronization and device identification in mobile communication systems. For instance, process 500 may be an example implementation, whether partially or completely, of the proposed schemes, concepts and examples described above from the perspective of a transmitting (TX) device for sequence design for synchronization and device identification in mobile communication systems. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Process 500 may also include additional operations and/or acts not shown in FIG. 5. Moreover, the blocks of process 500 may be executed in the order shown in FIG. 5 or, alternatively in a different order. The blocks of process 500 may be executed iteratively. Process 500 may be implemented by or in apparatus 402 and apparatus 404 as well as any variations thereof. Solely for illustrative purposes and without limiting the scope, process 500 is described below with reference to apparatus 402. Process 500 may begin at block 510.

At 510, process 500 may involve processor 410 of apparatus 402 generating a set of root sequences. Process 500 may proceed from 510 to 520.

At 520, process 500 may involve processor 1210 generating a set of signature sequences from the set of root sequences. Each signature sequence of the set of signature sequences may identify apparatus 402. Process 500 may proceed from 520 to 530.

At 530, process 500 may involve processor 1210 transmitting, via transmitter 432 of transceiver 430 of apparatus 402, a signal comprising one or more of the signature sequences to a receiving device (e.g., receiver 464 of transceiver 460 of apparatus 404) via a wireless channel.

In some implementations, in generating the set of root sequences, process 500 may involve processor 1210 generating the set of root sequences such that an ambiguity function of each root sequence is less than a first threshold and that a cross-ambiguity function between any pair of root sequences of the set of root sequences is less than a second threshold.

In some implementations, in generating the set of root sequences, process 500 may involve processor 1210 generating m-sequences of a length $N=2^q-1$ and an arbitrary phase by a set of minimal polynomials of an order q, with q being an integer. In such cases, a subset of the m-sequences of the length $N=2^q$ 1 may form the set of root sequences.

In some implementations, in generating the set of root sequences, process 500 may involve processor 1210 generating $2^q+1$ $Z_4$ sequences of a length $N=2^q-1$ by a $q^{th}$ order polynomial over a group $Z_4$, with q being an integer. In such cases, a subset of the $2^q+1$ $Z_4$ sequences of the length $N=2^q-1$ may form the set of root sequences.

In some implementations, in generating the set of root sequences, process 500 may involve processor 1210 generating two m-sequences by two distinct minimal polynomials of an order q, with q being an integer. Additionally, process 500 may involve processor 1210 generating $2^q-1$ Gold sequences of a length $N=2^q-1$ by a sum of the two m-sequences. In such cases, a subset of the $2^q-1$ Gold sequences may form the set of root sequences. In some implementations, in transmitting the signal comprising one or more of the signature sequences, process 500 may involve processor 1210 generating one or more primary synchronization signals and generating a plurality of secondary synchronization signals. Additionally, process 500 may involve processor 1210 transmitting at least one of the one or more primary synchronization signals and transmitting one or more of the plurality of secondary synchronization signals.

In some implementations, in generating the one or more primary synchronization signals, process 500 may involve processor 1210 generating at least one of the one or more primary synchronization signals as an m-sequence of an arbitrary phase of either of the two m-sequences used to construct the Gold sequences. Moreover, process 500 may involve processor 1210 generating another of the one or more primary synchronization signals as a first primary synchronization signal cyclically shifted in a frequency domain by a unique offset. In such cases, the plurality of secondary synchronization signals may be generated using the Gold sequences.

In some implementations, in generating the one or more primary synchronization signals, process 500 may involve processor 1210 generating at least one of the one or more primary synchronization signals as a set of cyclically shifted m-sequences in a frequency domain. Additionally, in generating the plurality of secondary synchronization signals, process 500 may involve processor 1210 generating at least one of the plurality of secondary synchronization signals as a set of the Gold sequences. In such cases, one of the two m-sequence used to construct the Gold sequences may be one of the one or more primary synchronization signals of an arbitrary phase.

In some implementations, in generating the set of root sequences, process 500 may involve processor 1210 generating $2^q+1$ $Z_4$ sequences of a length $N=2^q-1$ from a $Z_4$ generating sequence and a characteristic m-sequence. In such cases, a subset of the $2^q+1$ $Z_4$ sequences of the length $N=2^q-1$ may form the set of root sequences.

In some implementations, the $Z_4$ generating sequence may include an arbitrary $Z_4$ sequence that is not an m-sequence. Moreover, the characteristic m-sequence may include a square of the $Z_4$ generating sequence or a cyclic shift of a resulting m-sequence.

In some implementations, in generating the $2^q+1$ $Z_4$ sequences of the length $N=2^q-1$ from the $Z_4$ generating sequence and the characteristic m-sequence, process 500 may involve processor 1210 generating the arbitrary $Z_4$ sequence using a Linear Feedback Shift Register (LFSR) over a $Z_4$ group.

In some implementations, process 500 may also involve processor 1210 generating remaining $Z_4$ sequences by performing element-wise complex multiplication between the $Z_4$ generating sequence and cyclic shifts of the characteristic m-sequence.

In some implementations, in transmitting the signal comprising one or more of the signature sequences, process 500 may involve processor 1210 generating one or more primary synchronization signals and generating a plurality of secondary synchronization signals. Additionally, process 500 may involve processor 1210 transmitting at least one of the one or more primary synchronization signals and transmitting one or more of the plurality of secondary synchronization signals.

In some implementations, in generating the one or more primary synchronization signals, process 500 may involve processor 1210 generating at least one of the one or more primary synchronization signals as a characteristic m-sequence of an arbitrary phase used to construct the $Z_4$ sequences. Moreover, process 500 may involve processor 1210 generating another of the one or more primary synchronization signals as a first primary synchronization signal cyclically shifted in a frequency domain by a unique offset. In such cases, the plurality of secondary synchronization signals may be generated using the $Z_4$ sequences.

In some implementations, in generating the one or more primary synchronization signals, process 500 may involve processor 1210 generating at least one of the one or more primary synchronization signals as a set of cyclically shifted m-sequences in a frequency domain. Additionally, in generating the plurality of secondary synchronization signals, process 500 may involve processor 1210 generating at least one of the plurality of secondary synchronization signals as a set of the $Z_4$ sequences. In such cases, the characteristic m-sequence used to construct the $Z_4$ sequences may be one of the one or more primary synchronization signals of an arbitrary phase.

In some implementations, in generating the set of signature sequences from the set of root sequences, process 500 may involve processor 1210 cyclically shifting root sequences of the set of root sequences in either or both of a time domain and a frequency domain. In some implementations, in cyclically shifting the root sequences of the set of root sequences in the time domain, process 500 may involve processor 1210 cyclically shifting the root sequences by a shift that is no less than a maximum delay spread of the wireless channel. Moreover, in cyclically shifting the root sequences of the set of root sequences in the frequency domain, process 500 may involve processor 1210 cyclically shifting the root sequences by a shift that is greater than 1 but no less than a maximum Doppler spread of the wireless channel.

Figure 6:
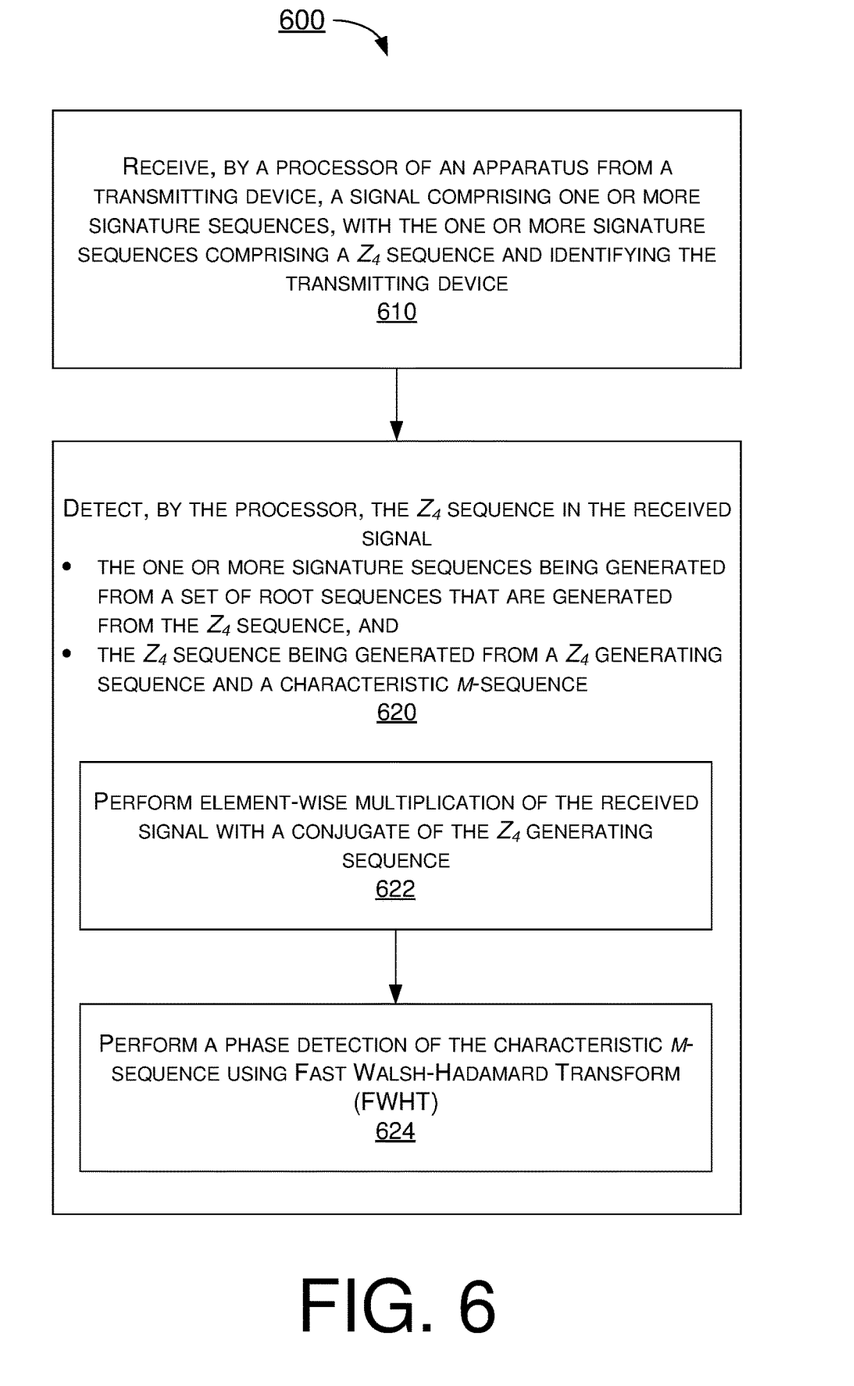
FIG. 6 is a flowchart of a process in accordance with the present disclosure.

FIG. 6 illustrates an example process 600 in accordance with an implementation of the present disclosure. Process 600 may represent an aspect of implementing the proposed concepts and schemes such as one or more of the various schemes, concepts, embodiments and examples described above. More specifically, process 600 may represent an aspect of the proposed concepts and schemes pertaining to sequence design for synchronization and device identification in mobile communication systems. For instance, process 600 may be an example implementation, whether partially or completely, of the proposed schemes, concepts and examples described above from the perspective of a receiving (RX) device for sequence design for synchronization and device identification in mobile communication systems. Process 600 may include one or more operations, actions, or functions as illustrated by one or more of blocks 610 and 620 as well as sub-blocks 622 and 624. Although illustrated as discrete blocks, various blocks of process 600 may be divided into additional blocks, combined into fewer blocks, or eliminated, depending on the desired implementation. Process 600 may also include additional operations and/or acts not shown in FIG. 6. Moreover, the blocks of process 600 may be executed in the order shown in FIG. 6 or, alternatively in a different order. The blocks of process 600 may be executed iteratively. Process 600 may be implemented by or in apparatus 402 and apparatus 404 as well as any variations thereof. Solely for illustrative purposes and without limiting the scope, process 600 is described below with reference to apparatus 404. Process 600 may begin at block 610.

At 610, process 600 may involve processor 440 of apparatus 404 receiving, via receiver 464 of transceiver 460 of apparatus 404 from a transmitting device, a signal comprising one or more signature sequences. The one or more signature sequences include a $Z_4$ sequence. Moreover, the one or more signature sequences identify the transmitting device (e.g., apparatus 402). Process 600 may proceed from 610 to 620.

At 620, process 600 may involve processor 440 detecting the $Z_4$ sequence in the received signal. The one or more signature sequences may be generated from a set of root sequences that are generated from the $Z_4$ sequence. The $Z_4$ sequence may be generated from a $Z_4$ generating sequence and a characteristic m-sequence.

The detecting of the $Z_4$ sequence in the received signal may involve a number of operations as represented by 622 and 624.

At 622, process 600 may involve processor 440 performing element-wise multiplication of the received signal with a conjugate of the $Z_4$ generating sequence. Process 600 may proceed from 622 to 624.

At 624, process 600 may involve processor 440 performing a phase detection of the characteristic m-sequence using Fast Walsh-Hadamard Transform (FWHT).

In some implementations, in performing the phase detection of the characteristic m-sequence using the FWHT, process 600 may involve processor 440 performing a permutation on the received signal before FWHT is applied. In such cases, a complexity of the FWHT may be in an order of $N \log_2 N$ for all N phases, with N denoting a sequence length.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by the processor of an apparatus, a signal comprising one or more signature sequences of a set of signature sequences, which are generated from a set of root sequences, to a receiving device via a wireless channel,
   wherein each signature sequence of the set of signature sequences identifies the apparatus,
   wherein the set of root sequences are generated by one of a first procedure, a second procedure and a third procedure,
   wherein the first procedure comprises:
      generating $2^q+1$ $Z_4$ sequences of a length $N=2^q-1$ by a $q^{th}$ order polynomial over a group $Z_4$, with q being an integer,
      wherein a subset of the $2^q+1$ $Z_4$ sequences of the length $N=2^q-1$ forms the set of root sequences,
   wherein the second procedure comprises:
      generating two m-sequences by two distinct minimal polynomials of an order q, with q being an integer; and
      generating $2^q-1$ Gold sequences of a length $N=2^q-1$ by a sum of the two m-sequences,
      wherein a subset of the $2^q-1$ Gold sequences forms the set of root sequences, and
   wherein the third procedure comprises:
      generating $2^q+1$ $Z_4$ sequences of a length $N=2^q-1$ from a $Z_4$ generating sequence and a characteristic m-sequence,
      wherein a subset of the $2^q+1$ $Z_4$ sequences of the length $N=2^q-1$ forms the set of root sequences.

2. The method of claim 1, wherein the transmitting of the signal comprising one or more signature sequences of the set of signature sequences comprises:
   generating one or more primary synchronization signals;
   generating one or more of secondary synchronization signals;
   transmitting at least one of the one or more primary synchronization signals; and
   transmitting at least one of the one or more secondary synchronization signals.

3. The method of claim 2,
   wherein a first of the one or more primary synchronization signals is an m-sequence of an arbitrary phase of either of the two m-sequences used to construct the Gold sequences,
   wherein at least another of the one or more primary synchronization signals is a first primary synchronization signal cyclically shifted in a frequency domain by a unique offset, and
   wherein the one or more secondary synchronization signals are generated using the Gold sequences.

4. The method of claim 1, wherein the $Z_4$ generating sequence comprises an arbitrary $Z_4$ sequence that is not an m-sequence, and wherein the characteristic m-sequence comprises a square of the $Z_4$ generating sequence or a cyclic shift of a resulting m-sequence.

5. The method of claim 4, wherein the generating of the $2^q+1$ $Z_4$ sequences of the length $N=2^q-1$ from the $Z_4$ generating sequence and the characteristic m-sequence comprises generating the arbitrary $Z_4$ sequence using a Linear Feedback Shift Register (LFSR) over a $Z_4$ group.

6. The method of claim 5, further comprising:
   generating remaining $Z_4$ sequences by performing element-wise complex multiplication between the $Z_4$ generating sequence and cyclic shifts of the characteristic m-sequence.

7. The method of claim 1, wherein the transmitting of the signal comprising one or more of the signature sequences comprises:
   generating one or more primary synchronization signals;
   generating one or more secondary synchronization signals;
   transmitting at least one of the one or more primary synchronization signals; and
   transmitting at least one of the one or more secondary synchronization signals.

8. The method of claim 7,
   wherein a first of the one or more primary synchronization signals is a characteristic m-sequence of an arbitrary phase used to construct the $Z_4$ sequences,
   wherein at least another of the one or more primary synchronization signals is a first primary synchronization signal cyclically shifted in a frequency domain by a unique offset, and
   wherein the one or more secondary synchronization signals are generated using the $Z_4$ sequences.

9. The method of claim 1, wherein the set of signature sequences are generated from the set of root sequences by cyclically some or all of shifting root sequences of the set of root sequences in either or both of a time domain and a frequency domain.

10. The method of claim 9, wherein the cyclically shifting of the root sequences of the set of root sequences in the time domain comprises cyclically shifting the root sequences by a shift that is no less than a maximum delay spread of the wireless channel, and wherein the cyclically shifting of the root sequences of the set of root sequences in the frequency domain comprises cyclically shifting the root sequences by a shift that is greater than 1 but no less than a maximum Doppler spread of the wireless channel.

11. A method, comprising:
    receiving, by a processor of an apparatus from a transmitting device, a signal comprising one or more signature sequences, the one or more signature sequences comprising a $Z_4$ sequence and identifying the transmitting device; and
    detecting, by the processor, the $Z_4$ sequence in the received signal,
    wherein the one or more signature sequences are generated from a set of root sequences that are generated from the $Z_4$ sequence, and
    wherein the $Z_4$ sequence is generated from a $Z_4$ generating sequence and a characteristic m-sequence.

12. The method of claim 11, wherein the detecting of the $Z_4$ sequence in the received signal comprises:
    performing element-wise multiplication of the received signal with a conjugate of the $Z_4$ generating sequence.

13. The method of claim 12, wherein the detecting of the $Z_4$ sequence in the received signal further comprises:

performing a phase detection of the characteristic m-sequence using Fast Walsh-Hadamard Transform (FWHT).

14. The method of claim 13, wherein the performing of the phase detection of the characteristic m-sequence using the FWHT comprises performing a permutation on the received signal before FWHT is applied, wherein a complexity of the FWHT is in an order of $N \log_2 N$ for all N phases, and wherein N denotes a sequence length.

* * * * *